(12) United States Patent
Ratte

(10) Patent No.: US 6,996,931 B1
(45) Date of Patent: Feb. 14, 2006

(54) FISHING LINE CLAMP SINKER

(75) Inventor: Geoffrey S. Ratte, Metairie, LA (US)

(73) Assignee: Water Gremlin Company, White Bear, MN (US)

( * ) Notice: Subject to any disclaimer, the term of this patent is extended or adjusted under 35 U.S.C. 154(b) by 678 days.

(21) Appl. No.: 09/638,743

(22) Filed: Aug. 14, 2000

Related U.S. Application Data

(63) Continuation-in-part of application No. 08/867,950, filed on Jun. 30, 1997, now Pat. No. 6,161,326, which is a continuation-in-part of application No. 08/651,053, filed on May 21, 1996, now abandoned.

(51) Int. Cl.
*A01K 95/00* (2006.01)
(52) U.S. Cl. ..................... 43/44.91; 43/44.89
(58) Field of Classification Search ................ 43/44.9, 43/44.91, 44.87, 44.89, 42.36, 42.39
See application file for complete search history.

(56) References Cited

U.S. PATENT DOCUMENTS

| | | | | | |
|---|---|---|---|---|---|
| 3,808,728 A | * | 5/1974 | Ratte, Jr. | .................... | 43/44.91 |
| 4,145,833 A | * | 3/1979 | Ratte | .......................... | 43/44.89 |
| 4,459,775 A | * | 7/1984 | Ratte | .......................... | 43/44.89 |
| 4,944,107 A | * | 7/1990 | Wymore | .................... | 43/44.89 |
| 5,035,534 A | * | 7/1991 | Brock et al. | ................ | 43/44.91 |
| 5,537,775 A | * | 7/1996 | Crumrine | .................... | 43/42.38 |

\* cited by examiner

*Primary Examiner*—Kurt Rowan
(74) *Attorney, Agent, or Firm*—Jacobson & Jacobson

(57) ABSTRACT

A fishing line clamp sinker with a tension adjusted hinge having line centering surfaces including a streamline clamp for attachment to a fishing line in front of a worm weight or the like to prevent the worm weight from sliding along the fishing line with the clamp sinker present a streamline shape to inhibit action that might twist the line as the line and sinker are pulled through the water.

10 Claims, 5 Drawing Sheets

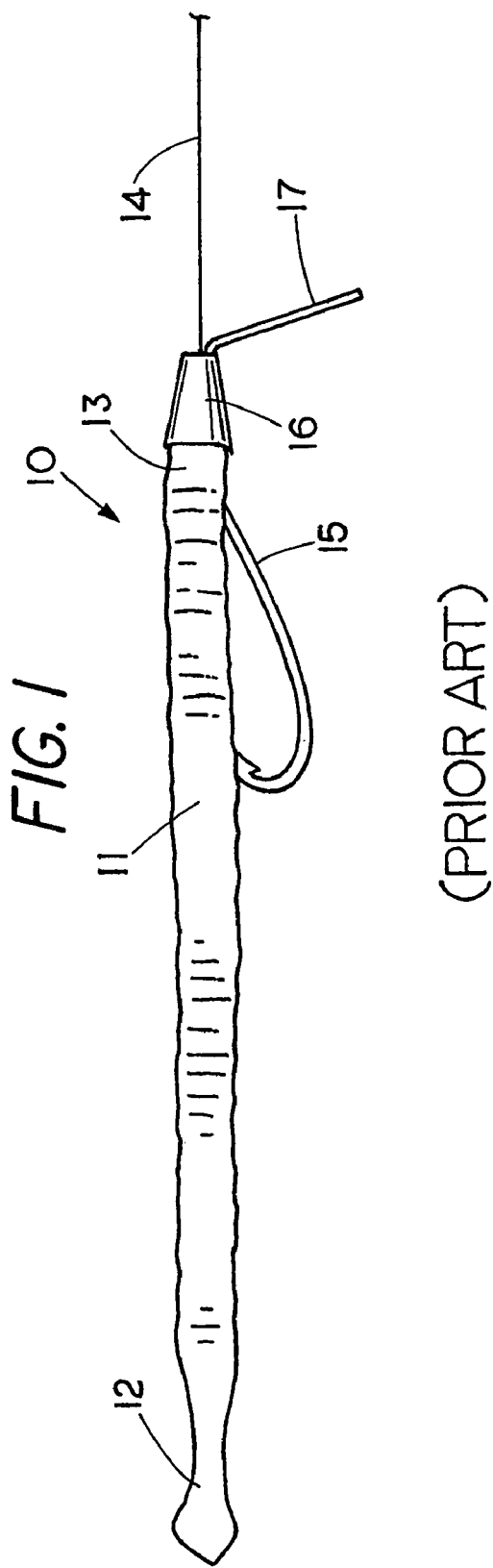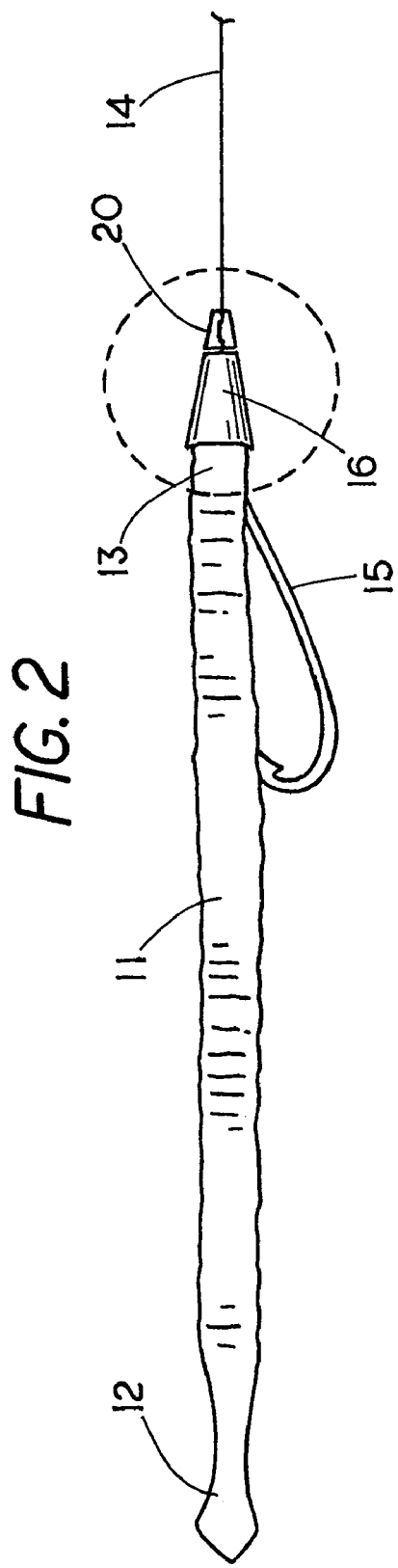
FIG. 1 (PRIOR ART)
FIG. 2

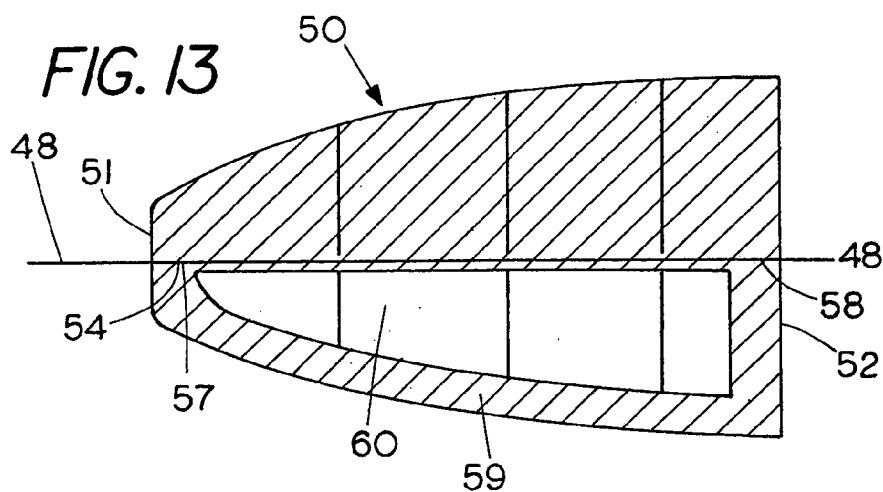
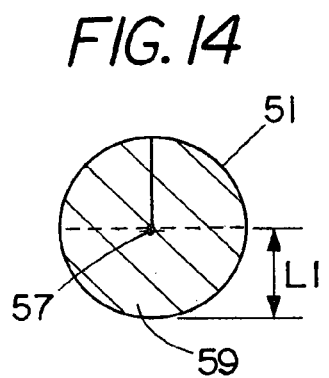
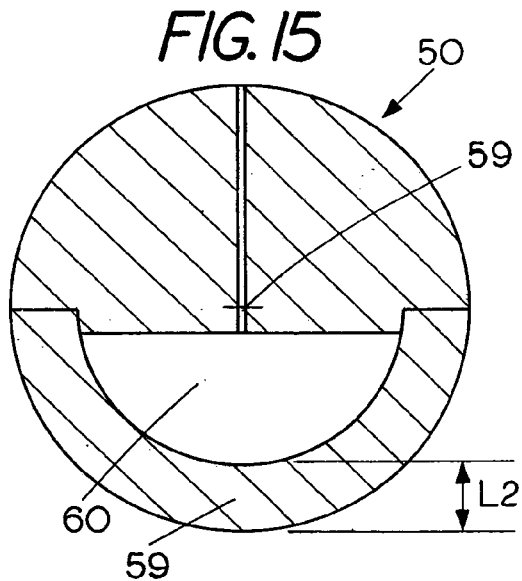
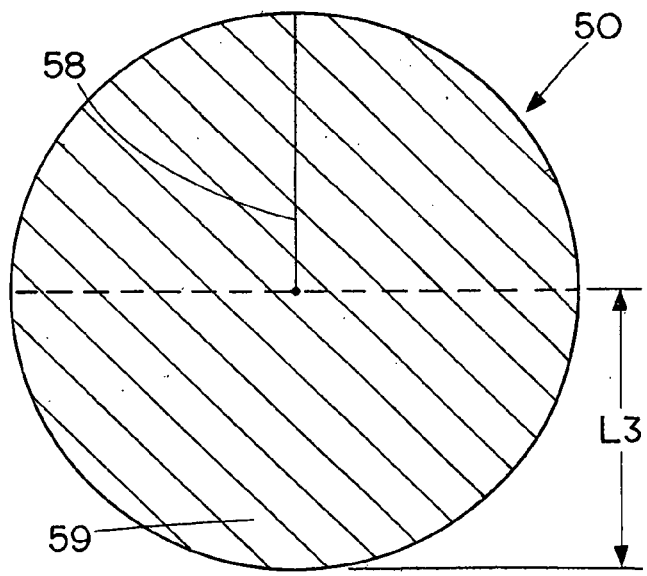

FISHING LINE CLAMP SINKER

CROSS REFERENCE TO RELATED APPLICATIONS

This application is a continuation in part of my U.S. patent application Ser. No. 08/867,950 filed Jun. 3, 1997, which is a continuation in part of my U.S. patent application Ser. No. 08/651,053 filed May 21, 1996, now abandoned titled FISHING LINE CLAMP.

FIELD OF THE INVENTION

This invention relates generally to clamps and, more specifically, to a clamp sinker for holding a slideable worm weight or itself in a fixed position on a fishing line while inhibiting twisting action on the fishing line.

BACKGROUND OF THE INVENTION

The concept of worm weights and fishing rigs that use soft plastic worms is well known in the art. One of the more well known rigs is the Texas rig which uses a plastic worm, a slip sinker, called a worm weight, and a hook. The hook is extended through the end of the plastic worm with the pointed end of the hook embedded in the plastic worm to make the worm rig less prone to snagging. The worm weight, which is centrally located on the line has a bullet like shape with a central opening and fits around the line with sufficient clearance so the sinker is free to slide up and down the line. However, when fishing in weeds the sliding worm weight can cause problems as the worm weight tends to get hung up in the weeds. In order to prevent the worm weight from sliding a clamp is used to hold the worm weight in position on the line. A prior art method of clamping the worm weight in position is accomplished by forcing a toothpick into the opening in the worm weight which jams the line against the interior passage in the worm weight thus preventing the worm weight from slipping on the line. The present invention comprises an improved clamp sinker to hold the worm weight in position without having to use a toothpick to jam the line against the worm weight or to hold itself in centered postion on a fishing line. The present invention provides a line clamp sinker that can be attached to the line in front of the worm weight and because of the streamline shape on the exterior surface of the clamp the clamp coacts with the sinker shape to form a fishing rig that can be pulled through the water and weeds with a minimum of snagging or line twisting. As an alternate use as a clamp sinker the clamp sinker can be secured to the line to hold itself in postion or another fishing item in postion while provding sinker action.

BRIEF DESCRIPTION OF THE PRIOR ART

U.S. Pat. No. 1,618,100 shows a fishing sinker with crevices for looping the fishing line around the sinker.

U.S. Pat. No. 2,735,652 shows a tear shaped fishing sinker where the line is looped around the sinker.

U.S. Pat. No. 2,741,067 shows a snap on sinker with a ring to hold the halves of the sinker in position on the fishing line.

U.S. Pat. No. 3,701,212 shows a salt water sinker with crimpable arms that prevents removal of the sinker from a line.

U.S. Pat. No. 4,145,833 shows a fishing sinker with two halves that can be clamped on a fishing line to hold a line and bait under water.

U.S. Pat. No. 4,279,092 shows a fishing weight having an insert therein for engaging a fishing line.

U.S. Pat. No. 4,459,775 shows a weedless sinker having nubs on each end of the sinker to fold over the line.

U.S. Pat. No. 4,837,966 shows a cam action fishing sinker device.

U.S. Pat. No. 4,891,903 shows a sliding or fixed fishing sinker where the line can be looped on the sinker to prevent the sinker from sliding.

U.S. Pat. No. 4,944,107 shows a fixed and sliding spherical fishing sinker for attachment to a fishing line by clamping the two halves to the fishing line.

U.S. Pat. No. 4,964,236 shows a fishing line sinker having a quick attachment device.

SUMMARY OF THE INVENTION

Briefly, the present invention comprises a streamline clamp sinker for attachment to a fishing line in front of a worm weight or by itself with the clamp sinker presenting a streamline shape to inhibit action that might twist the line as the line as the clamp sinker is pulled through the water.

BRIEF DESCRIPTION OF THE DRAWINGS

FIG. 1 shows a prior art Texas rig with the worm weight being secured in position with a toothpick;

FIG. 2 shows the Texas rig of FIG. 1 with the line clamp of the present invention attached thereto to prevent the worm weight from sliding on the fishing line;

FIG. 13 is a cross sectional view of the line clamp sinker of FIG. 12;

FIG. 14 is a cross sectional view taken along lines 1414 of FIG. 12;

FIG. 15 is a cross sectional view taken along lines 15—15 of FIG. 12; and

FIG. 16 is a cross sectional view taken along lines 16—16 of FIG. 12;

DESCRIPTION OF THE PREFERRED EMBODIMENT

Figure 3:
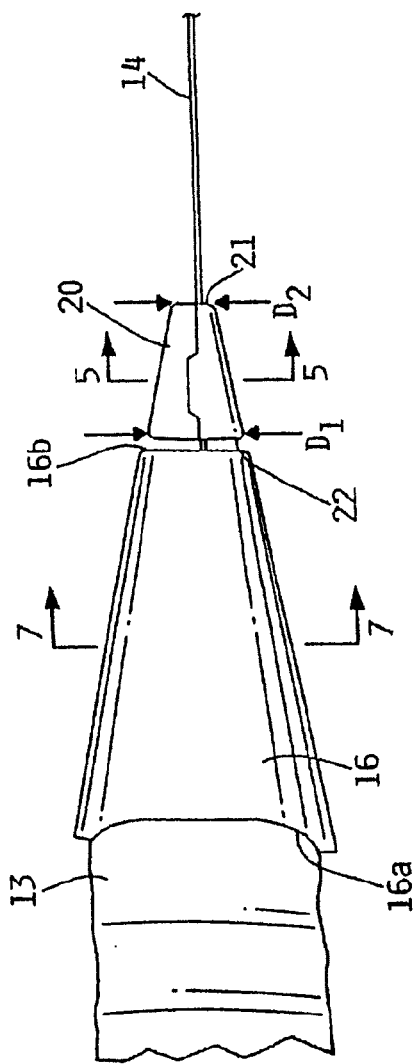
FIG. 3 shows an enlarged view of the portion of FIG. 2 outlined by dotted lines.

FIG. 1 shows a Texas rig 10 for fishing with plastic worms or the like. The Texas rig includes a flexible plastic worm 11 having a head 13 and a tail 12. A hook 15 connects to one end of line 14 and extends through head 13 with the pointed end of hook 15 embedded in the worm to minimize snagging of the rig as it is pulled through the water. In order to maintain the plastic worm at the proper fishing depth a lead weight commonly referred to as a worm weight 16 is mounted on line 14 immediately in front of head 13. Worm weight 13 generally comprises a bullet shaped article with a line hole extending through the weight. FIG. 1 shows the prior art clamping device for securing the worm weight to line 13 comprising a breakable wood toothpick 17 which has had one end jammed into the opening of the worm weight that carries the fishing line. Once the toothpick is jammed in the opening the toothpick is broken off so that only a small portion of the toothpick protrudes from the worm weight.

FIG. 2 shows the Texas rig 10 with line clamp 20 of the present invention located in front of worm weight 16.

FIG. 3 shows line clamp or clamp sinker 20 and the front portion of the Texas rig in greater detail. Line clamp 20 is movable between an open condition (FIG. 6) and a closed condition, as shown in FIG. 2, for preventing worm weight 16 from sliding along fishing line 14. Line clamp 20 comprises a body of bendable material for circumferentially squeezing a fishing line with the line clamp having a first leading end 21 and a second larger end with the first end 21 of line clamp 20 being smaller in cross sectional area than the second end 22 when the line clamp is attached to a fishing line. Clamp 20 is characterized by being smaller than the worm weight and having an exterior surface with the exterior surface of the body smoothly converging from first end 21 to the second end 22 to form a streamline shape that inhibits twisting or propeller action of the clamp as the rig is pulled through the water. By inhibiting propeller action by the line clamp one inhibits line twisting which can lead to snarling of the line in the reel. The streamline shape of line clamp 20 is compatible with a streamline shape of a worm weight 16 so that when the line clamp 20 is positioned in front of worm weight 16 it not only acts as a stop for a worm weight 16 but the streamline shape of the body of line clamp 20 cooperates with the streamline shape of the worm weight 16 to produce a fishing rig that minimizes snagging as the rig is pulled through weeds.

Figure 6:
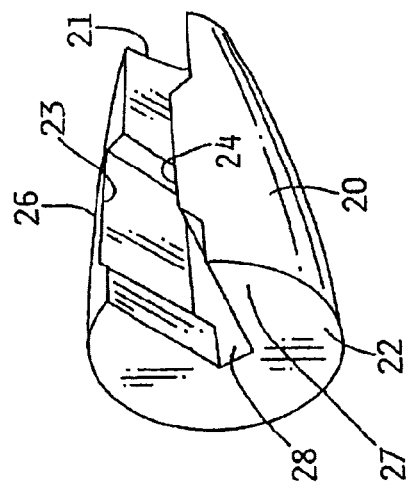
FIG. 6 is perspective view of the clamp of FIG. 2.

FIG. 6 shows line clamp 20 with bendable jaws 26 and 27 in the open condition. Line clamp 20 includes a first line gripping surface 23 extending to the geometric center of clamp 20 as defined by surface 28. Gripping surface 23 extend from the first end 21 to the second end 22 with second end 22 having a flat surface for allowing the worm weight to adopt a central position thereon. That is surface 27 by being symmetrical does not force the worm weight to follow there behind in an unusual angle. Line gripping surface 23 includes at least one recess surface and line griping surface 24 includes a raised surface that forms mating engagement with line gripping surface 24 to circumferentially grasp and lock a line therein by providing a nonlinear path through the line clamp. That is, when the line gripping surface 23 and line gripping surfaces 24 are in the closed condition they coact to grasp a fishing line located therein and prevent the slippage of the fishing line therein. As the jaws extend to the geometric center of the clamp a line placed in the bottom 28 of the clamp 20 will be positioned in the center of the clamp and will minimize the tendency of the clamp to act like a propeller as the clamp 20 is pulled through the water as well as minimizing snagging in the weeds. Jaws 23 and 24 are characterized by being asymmetrical in that the hinge region formed as the jaws 23 and 24 interact and vary from a first thickness to a second larger thickness.

Figure 4:
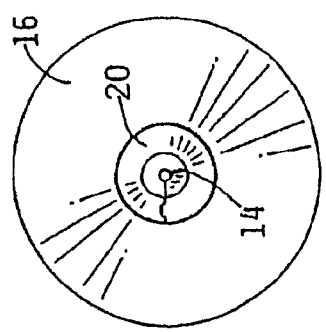
FIG. 4 shows an end view of the clamp and worm weight of FIG. 3.

FIG. 4 shows an end view of the worm weight and line with line clamp 20 located thereon. In this view one notes that the line clamp is considerably smaller than the worm weight and has diverging sides that diverge outward in the same manner as the sides of worm weight 16 to produce a rig that can be pulled through the weeds with a minimum of snagging.

Figure 7:
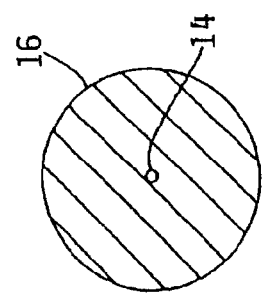
FIG. 7 is a cross sectional view taken along lines 7—7 of FIG. 3.

FIG. 7 shows a cross sectional view taken along lines 7—7 of FIG. 3 to illustrate the worm weight 16 is a solid piece of material with a central opening therein for a fishing line.

It should be kept in mind that the worm weight is placed on the line for weight and although the line clamp 20 has an incidental weight it is the central clamping action of the line clamp that performs the line holding function. Line Clamp 20 includes an outer truncated cone shape with a neutral stop surface 22 to prevent sliding of the worm weight along the fishing line. Surface 20 is a neutral stop surface as surface 22 does not force the worm weight askew of the fishing line by a clamp that would provide a guide surface that directs either of the clamp or the worm weight to a path which is not parallel to the fishing line.

Figure 5:
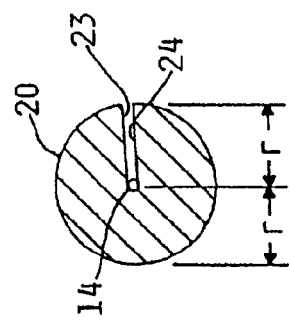
FIG. 5 shows a sectional view taken along lines 5—5 of FIG. 3.

FIG. 5 is a cross sectional view taken along lines 5—5 of FIG. 3 to illustrate that the surfaces 23 and 24 are in mating engagement with each other and that line 14 is located in the center of clamp 20 as indicated by the equal dimensions "r" extending radially outward from fishing line 14 which is located in the center of clamp 20.

As can be seen from the drawings, line clamp 20 is made from a nonresilient material which can be bent around the line, preferably by finger pressure. Suitable materials are plastics and certain metals. If the worm weight is made of lead a suitable materiel for making the line clamp, could be lead; however, the line clamp like the hook is not on the line to provide weight but is attached to the line to grasp the line and prevent the worm weight from sliding while creating a generally streamline shaped stop that is not prone to acting like a propeller. Line clamp 20 when used in conjunction with a worm weight should be made sufficiently small so that the weight of the line clamp 20 is insufficient to act or perform as a weight for the fishing rig.

Figure 8:
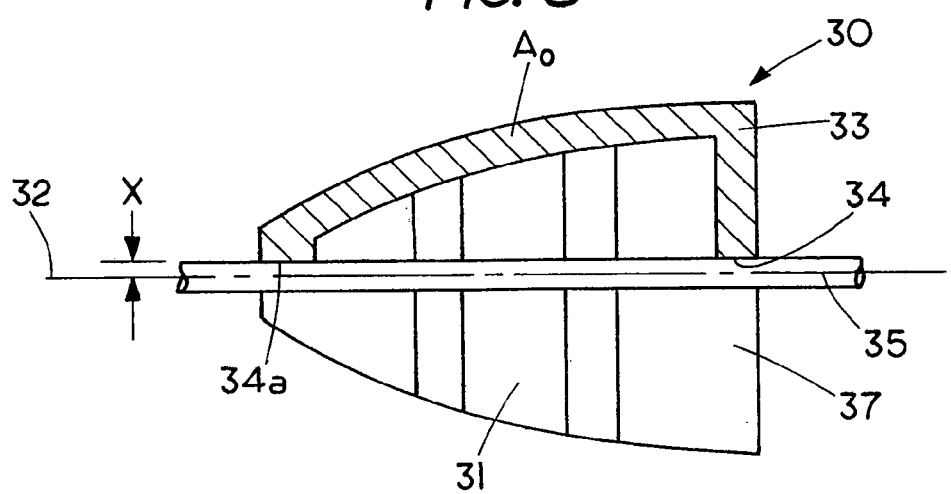
FIG. 8 is cross sectional view of a first half of a line clamp showing a peripheral hinge.
Figure 9:
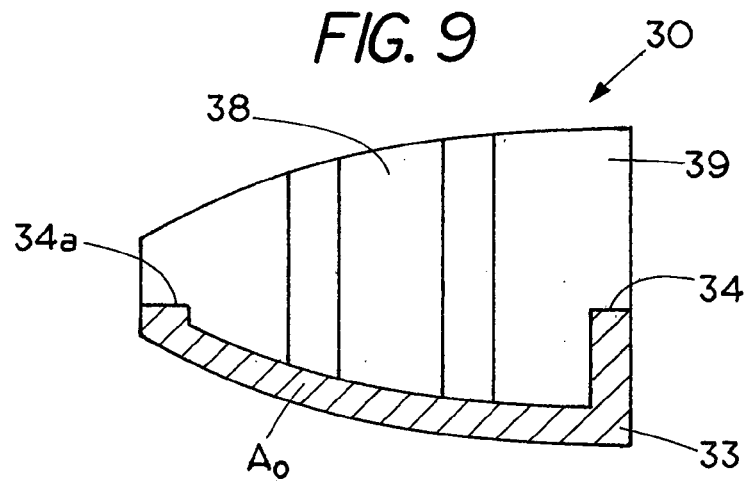
FIG. 9 is a cross sectional view of the other half of line clamp of FIG. 8.

FIG. 8 shows a sectional view of one half of a tension adjusted line clamp or sinker stopper 30 and FIG. 9 shows a sectional view of the other half of a tension adjusted line clamp or sinker stopper 30 with an integral peripheral hinge 33 (shown in section) for connecting the two halves together. One half of sectioned sinker stopper is identified by numeral 37 and is shown in FIG. 8 and the other half of sectioned sinker stopper is identified by reference numeral 39 and is shown in FIG. 9. In order to reveal the interior of sinker stopper 30 the sinker stopper has been sectioned axially and each of the halves 37 and 39 are shown in a plane view with the common connecting region 33, which forms a tension adjusted peripheral hinge 33, having an area $A_o$ and line centering surfaces 34 and 34a located on opposite ends of hinge 33. The use of a controlled connecting area $A_o$ allows one to preset the tension force necessary to open and close the two halves of the sinker stopper 30 and still maintain the streamline exterior that prevents twisting. That is, with a larger area $A_o$ the sinker stopper is more difficult to open and close and with a smaller area $A_o$ the sinker stopper is less difficult to open and close. Consequently, one can form a sinker stopper of various sizes that are suitable for squeezing around a fishing line without undue finger pressure. In addition the use of line centering surfaces 34 and 34a located on peripheral hinge 33 maintain the line 35 in a centered condition within sinker stopper 30.

FIG. 8 shows that a protrusion 31 extends from the hinge area 33 to the opposite edge of sinker stopper and FIG. 9 shows that a mating recess 38 extends from hinge 33 to the opposite side of sinker half 39.

Figure 10:
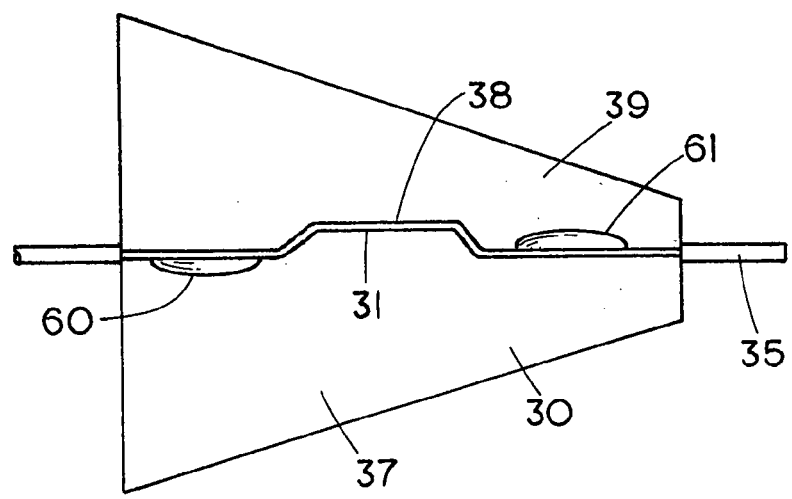
FIG. 10 is an assembled view of the line clamp of FIG. 8 and FIG. 9.

FIG. 10 shows a top view of sinker stopper 30 in the unsectioned condition with protrusion 31 on sinker half 37 engaging recess 38 on sinker half 39. Located on the top half of sinker half 37 is a first relief which I refer to as a thumbnail recess 61 and located on the bottom half of sinker 37 is a second relief which I also refer to as a thumbnail recess 60 that allow a user to quickly pry open a closed sinker to remove a line without the aid of any special tools by inserting his or her thumbnail or fingernail therein. The thumbnail recess 60 and 61 comprises an elongated peripheral relief that extends radially inward sufficiently far for a user to insert his or her fingernail into the thumbnail recess. As one thumbnail recess is located on each of the halves it permits a user to pry apart the sinker 37 when the sinker is in a closed condition. That is, a first thumbnail is inserted in recess 61 which allows user to bear against lower half of sinker 37 and a second thumbnail inserted in recess 60 allows a user to bear against upper half of sinker 37 to open sinker 37.

In the embodiment 30 the sinker stopper provides line centering capabilities through line centering surfaces 34 and 34a which are spaced a distance "x" from a center line 35. That is the line centering surfaces can be spaced a distance generally equal to half the thickness of the fishing line in order to ensure that the sinker stopper is centered on the line. With use of small diameter lines the line centering surfaces 34 and 34a can be placed on the geometric center defined by central axis 32 without affecting the balance of the sinker stopper 30.

A further feature of the invention is that the peripheral hinge with surface stops 34 and 34a can be formed by forcing a knife-like blade into the central portion of the line clamp 30 sufficiently far so as to form the peripheral hinge 33.

Figure 11:
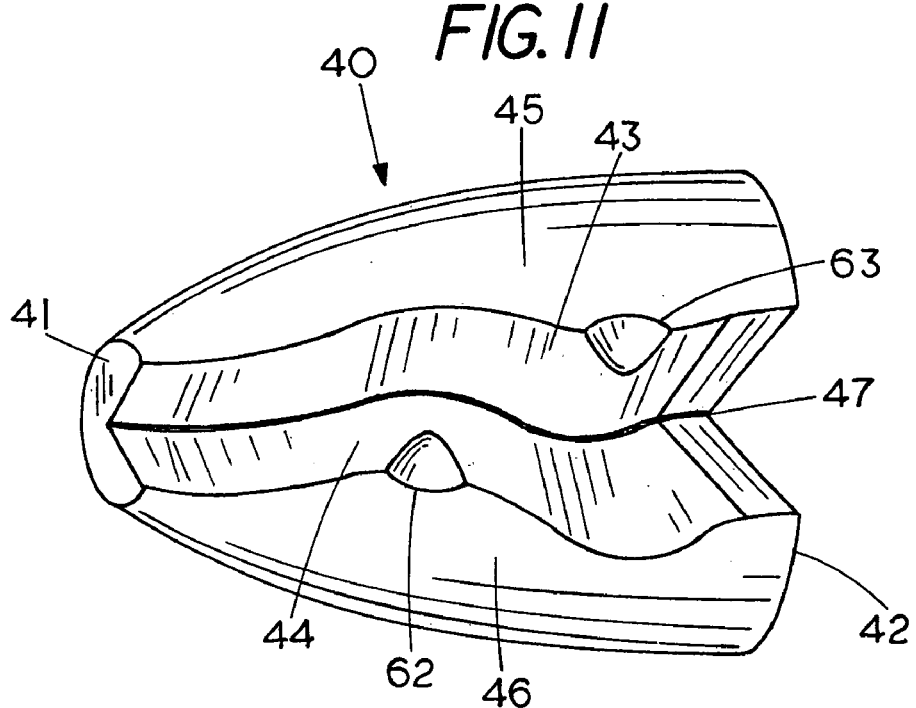
FIG. 11 is a perspective view of an alternate embodiment of a line clamp sinker in an open condition.

FIG. 11 shows an alternate embodiment of line clamp sinker 40 with bendable jaws 45 and 46 in the open condition. Line clamp 40 includes a first smoothly curved, undulating gripping surface 43 extending to the center of clamp 40 as defined by surface junction line 47. A first curved gripping a symmetrical surface 43 extends from the first end 41 of line clamp 40 to the second end 42 of line clamp 40. Second end 42 of clamp 40 has a flat surface 46 for allowing a worm weight or the like to adopt a central position thereon.

Curved gripping surface 43 includes at least one smoothly curved surface contouring protrusion and a second curved, undulating asymmetrical gripping surface 44 includes at least one surface contouring recess that forms mating engagement with line gripping surface 43 to circumferentially grasp and lock a line therebetween by providing a curving, undulating path through line clamp 40. That is, when first curved gripping surface 43 and second curved gripping surface 44 are in the closed condition they coact to grasp the fishing line located therein and prevent the slippage of the fishing line therein by frictional engagement which is aided by the longer curved surfaces since the length of line in contact with the sinker is longer than if the surface were straight. In addition, the curved surfaces ensure that the line is not damaged by the jaws. As the jaws extend to the geometric center of the clamp a line placed in the bottom 47 of clamp 40 is positioned in the center of the clamp minimizes the tendency of the clamp to act like a propeller as clamp 40 is pulled through the water as well as minimizing snagging in the weeds. Jaws 45 and 46, by having a curved gripping surface, will alleviate undue stress as a result of the grip that clamp 40 has on the line when clamp 40 is in the closed position.

Located at the peripheral edge of sinker 40 is a first thumbnail recess 63 and a second thumb nail recess 62 which extend inward sufficiently far for a user to insert his or her fingernail or thumbnail therein. Typically, the thumbnail recess need extend in a 1/16 of an inch. Once inserted the user can quickly pry open the sinker. In the embodiment shown the thumbnail recess have a pie shape appearance with the edges of the relief smoothly blending into the sinker to eliminate any sharp edges.

Figure 12:
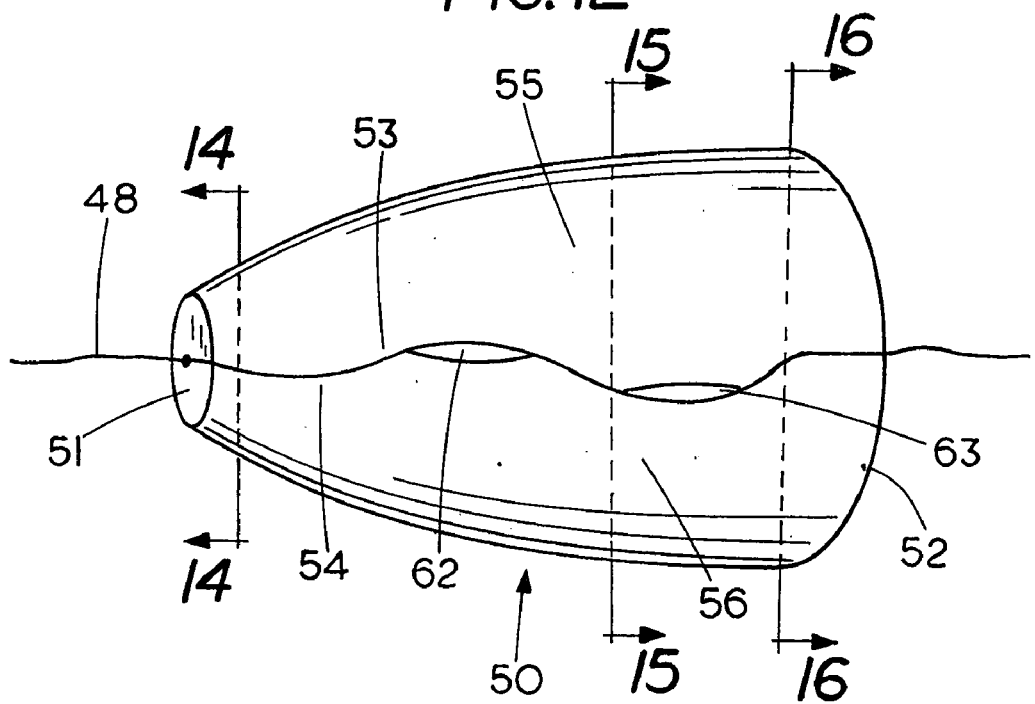
FIG. 12 is perspective view of a further alternate embodiment of a line clamp sinker in a closed condition.

FIG. 12 shows a line clamp 50 of a different embodiment than the line clamp 40 embodiment shown in FIG. 11. Line clamp 50 is shown with jaws 55 and 56 in a closed position gripping line 48 to form a cone-shaped structure. Line 48 is being grasped by line clamp 50 and is shown exiting from first end 51 and second end 52 of line clamp 50. The mating engagement between first curved line gripping surface 53 and second curved line gripping surface 54 forms a curving path through line clamp 50 for gripping and locking line 48 to prevent line 48 from slipping off of line clamp 50.

FIG. 13 is cross sectional view of the top of line clamp 50 showing an integral peripheral hinge 59 connecting the two jaws together. Peripheral hinge 59 has a first line centering surface 57 located at the first end 51 of line clamp 50 and a second line centering surface 58 located on the second end 52 of line clamp 50 for maintaining line 48 in a centered condition within line clamp 50. Located between first line centering surface 57 and second line centering surface 58 is a recess 60. The area of recess 60 is indirectly proportional to the area of peripheral hinge 59. If the area of recess 60 increases, the area of peripheral hinge 59 will decrease; vice versa, if the area of recess 60 decreases, the area of peripheral hinge 59 will increase. The area of peripheral hinge 59 controls the tension force necessary to open and close the jaws of line clamp 50 in that line clamp 50 is more difficult to open and close than with a larger peripheral area than a smaller peripheral area. In the embodiment shown the mating surfaces extend slightly past the center line so that line 48 can be engaged along the entire length of the sinker clamp.

FIG. 14 is a cross sectional view of FIG. 12 taken along the lines 14—14 to illustrate that the first end 51 of clamp 50 is composed of a solid core with peripheral hinge 59 having a width of $L_1$. Also locate at the first end 51 of line clamp 50 is first line centering surface 57 for maintaining the line in a centered condition at first end 51 of clamp 50.

FIG. 15 is a cross sectional view of FIG. 12 taken along the lines 15—15 showing the mid section of line clamp 50, recess 60, and peripheral hinge 59 having a width of $L_2$. The existence of recess 60 allows line clamp 50 to require less tension force necessary to open and close the jaws of line clamp 50 than if recess 60 did not exist in line clamp 50. The area of recess 60 is indirectly proportional to the area of peripheral hinge 59. FIG. 15 illustrates the geometric center 59 is located between the faces of the sinker so that if a line extends through the geometric center the line can be grasped along the entire length of line located between the two ends of the sinker.

FIG. 16 is a cross sectional view of FIG. 12 taken along the lines 16—16 to illustrate that second end 52 of clamp 50 is also composed of a solid core with peripheral hinge 59 having a width of $L_3$. Also locate at second end 52 of line clamp 50 is second line centering surface 58 for maintaining the line in a centered condition at second end 52 of clamp 50.

I claim:

1. A bullet shaped line clamp sinker movable between an open and closed condition comprising:
    a body composed of a bendable material, said body being cone shape and having a neutral surface, said body having a first end and a second end with said first end of said body being smaller than the second end of said body with said body having a smoothly converging exterior surface from said first end to said second end to form a streamline shape that inhibits snagging and propeller action as the body is pulled through a fluid;

a first curved gripping surface on said body, said first curved gripping surface undulating through said body to provide a surface free of angled corners to thereby inhibit line damping, said first curved gripping surface extending from said first end to said second end, said first curved gripping surface having at least one surface contouring protrusion, said first curved gripping surface having a portion extending proximate a geometric center of said line clamp; and a second curved gripping surface on said body said second curved gripping surface undulating through said body to provide a surface free of angled corners to thereby inhibit line damping, said second curved gripping surface extending from said first end to said second end with said second curved gripping surface including a surface contouring recess mateable with said protrusion to produce a nonlinear path through said resilient body so that when said second curved gripping surface and said first curved gripping surface coact to grasp a line located therein to prevent the slippage of the line therein as the line is squeezed and held therebetween by bending said line clamp around the line.

2. The bullet shaped line clamp sinker movable between an open and closed condition comprising:

a body composed of a bendable material, said body being cone shape and having a neutral surface, said body having a first end and a second end with said first end of said body being smaller than the second end of said body with said body having a smoothly converging exterior surface from said first end to said second end to form a streamline shape that inhibits snagging and propeller action as the body is pulled through a fluid;

a first curved gripping surface on said body, said first curved gripping surface undulating through said body to provide a surface free of angled corners to thereby inhibit line damping, said first curved gripping surface extending from said first end to said second end, said first curved gripping surface having at least one surface contouring protrusion, said first curved gripping surface having a portion extending proximate a geometric center of said line clamp;

a second curved gripping surface on said body said second curved gripping surface undulating through said body to provide a surface free of angled corners to thereby inhibit line damping, said second curved gripping surface extending from said first end to said second end with said second curved gripping surface including a surface contouring recess mateable with said protrusion to produce a nonlinear path through said resilient body so that when said second curved gripping surface and said first curved gripping surface coact to grasp a line located therein to prevent the slippage of the line therein as the line is squeezed and held therebetween by bending said line clamp around the line;

an integral peripheral hinge connecting the two jaws together, said peripheral hinge having a first line centering surface located at the first end of said line clamp and a second line centering surface located on the second of end of said line clamp, said line centering surface for maintaining said line in a centered condition within said line clamp;

a recess located between said first line centering surface and second line centering surface, said recess allowing said line clamp to require less tension force necessary to open and close the jaws of said line clamp than if said recess did not exist; and a first thumbnail recess and a second thumbnail recess located at a peripheral edge of said body, said first thumbnail recess and a second thumbnail recess extending inward sufficiently far to allow a user to insert a fingernail or a thumbnail therein.

3. The bullet shaped line clamp sinker of claim 1 wherein the body is a single continuous integral member with each of the line griping surfaces asymmetrical but mateable with each other.

4. The bullet shaped line clamp sinker of claim 1 wherein the body is an alloy of bismuth.

5. The bullet shaped line clamp sinker of claim 1 wherein the body is finger bendable.

6. The bullet shaped line clamp sinker of claim 1 wherein the body is a continuous integral member.

7. The bullet shaped line clamp sinker of claim 1 wherein the line clamp has an exterior diverging surface and a set of jaws that extend the entire length of the line clamp.

8. The bullet shaped line clamp sinker of claim 1 wherein the line clamp is one piece and includes two asymmetrical jaws extending to a geometric center of said line clamp with said jaws are movable between an open condition and a closed condition by pivoting the jaws.

9. The bullet shaped line clamp sinker of claim 1 including a first relief on a top half of the sinker and a second relief on the bottom half of the sinker to permit a user to insert a fingernail or thumbnail thereon to pry apart the sinker if the sinker is in a closed condition.

10. A bullet shaped line clamp sinker movable between an open and closed condition comprising:

a body composed of bendable material, said body being cone shape and having a neutral surface, said body having a first end and a second end with said first end of said body being smaller than the second end of said body with said body having a smoothly converging exterior surface from said first end to said second end to form a streamline shape that inhibits snagging and propeller action as the body is pulled through a fluid;

a first line gripping surface on a first end of said body, said first line gripping surface a second line gripping surface on the first end of said body for mating engagement with said firth line gripping surface;

a third line gripping surface on said second end of said body, said third line gripping surface spaced from said first line griping surface;

a fourth line gripping surface on the third end of said body for mating engagement with said third line gripping surface with said first line griping surface and said second line griping surface holding a line in a centered condition on the first end of the clamp sinker and the third line griping surface and the fourth line griping surface holding the line in a centered condition on the second end of said body;

a recess allowing said line clamp to require less tension force necessary to open and close the jaws of said line clamp than if said recess did not exist; and a first thumbnail recess and a second thumbnail recess located at a peripheral edge of said body, said first thumbnail recess and a second thumbnail recess extending inward sufficiently far to allow a user to insert a fingernail or a thumbnail therein.

* * * * *